United States Patent
Dollmeyer et al.

(10) Patent No.: US 7,484,357 B2
(45) Date of Patent: Feb. 3, 2009

(54) APPARATUS, SYSTEM, AND METHOD FOR DETERMINING AND IMPLEMENTING ESTIMATE RELIABILITY

(75) Inventors: Thomas A. Dollmeyer, Columbus, IN (US); Patrick J. Shook, Franklin, IN (US); J. Steve Wills, Columbus, IN (US); Joan Wills, Nashville, IN (US)

(73) Assignee: Cummins, Inc, Columbus, IN (US)

(*) Notice: Subject to any disclaimer, the term of this patent is extended or adjusted under 35 U.S.C. 154(b) by 31 days.

(21) Appl. No.: 11/227,060

(22) Filed: Sep. 15, 2005

(65) Prior Publication Data

US 2007/0056272 A1 Mar. 15, 2007

(51) Int. Cl.
*F01N 3/00* (2006.01)

(52) U.S. Cl. .............. 60/274; 60/277; 60/285; 60/295; 60/297; 714/1; 714/E11.02; 702/81; 702/84; 702/179; 702/180

(58) Field of Classification Search .......... 60/274, 60/277, 285, 286, 295, 297; 714/1, E11.02; 702/81, 84, 179, 180, 181
See application file for complete search history.

(56) References Cited

U.S. PATENT DOCUMENTS

| | | | |
|---|---|---|---|
| 6,405,528 B1 | 6/2002 | Christen et al. | 60/295 |
| 6,622,480 B2 | 9/2003 | Tashiro et al. | 60/295 |
| 6,756,904 B2 | 6/2004 | Kinugawa et al. | 340/606 |
| 6,758,037 B2 * | 7/2004 | Terada et al. | 60/295 |
| 6,758,039 B2 | 7/2004 | Kuboshima et al. | 60/311 |
| 6,829,889 B2 | 12/2004 | Saito et al. | 60/291 |
| 6,829,890 B2 | 12/2004 | Gui et al. | 60/295 |
| 6,854,265 B2 | 2/2005 | Saito et al. | 60/295 |
| 6,907,873 B2 | 6/2005 | Hamahata | 123/676 |
| 6,937,317 B2 * | 8/2005 | Morisada | 355/53 |
| 6,941,750 B2 * | 9/2005 | Boretto et al. | 60/297 |
| 7,065,960 B2 * | 6/2006 | Gioannini et al. | 60/295 |
| 7,188,512 B1 * | 3/2007 | Wills | 73/23.31 |
| 2002/0196153 A1 | 12/2002 | Kinugawa et al. | 340/606 |
| 2003/0167757 A1 | 9/2003 | Boretto et al. | 60/295 |
| 2004/0044499 A1 * | 3/2004 | House et al. | 702/181 |
| 2004/0123179 A1 * | 6/2004 | Dragomir-Daescu et al. | 714/1 |
| 2004/0172933 A1 | 9/2004 | Saito et al. | 60/277 |
| 2004/0204818 A1 | 10/2004 | Trudell et al. | 701/114 |

* cited by examiner

Primary Examiner—Binh Q. Tran
(74) Attorney, Agent, or Firm—Kunzler & McKenzie

(57) ABSTRACT

An apparatus, system, and method are disclosed for determining the reliability of an estimate such as particulate accumulation on a diesel particulate filter, weighing the estimate according to a function of its reliability, weighing a prediction of particulate accumulation on the filter according to a function of the estimate's reliability, and combining the weighted estimate and weighted prediction to determine a combined particulate load estimate. The degree of reliability can be expressed as a trust factor, and a function of the trust factor can be used in a low-pass filter of the estimate. The trust factor value depends on filter air flow and particulate distribution in one embodiment. Regeneration of the particulate filter may be initiated depending on the value of the combined particulate load estimate.

12 Claims, 11 Drawing Sheets

APPARATUS, SYSTEM, AND METHOD FOR DETERMINING AND IMPLEMENTING ESTIMATE RELIABILITY

BACKGROUND OF THE INVENTION

1. Field of the Invention

This invention relates to feedback systems, and more particularly to apparatuses, systems and methods for determining when to initiate regeneration of diesel particulate filters.

2. Description of the Related Art

Environmental concerns have motivated the implementation of emission requirements for internal combustion engines throughout much of the world. Governmental agencies, such as the Environmental Protection Agency ("EPA") in the United States, carefully monitor the emission quality of engines and set acceptable emission standards, to which all engines must comply. Generally, emission requirements vary according to engine type. Emission tests for compression-ignition or diesel engines typically monitor the release of diesel particulate matter (PM), nitrogen oxides ($NO_x$), and unburned hydrocarbons (HC). A critical emission of gasoline or other stoichiometric engines is carbon monoxide (CO). Catalytic converters have been implemented in exhaust gas after-treatment systems for spark-ignition engines, eliminating many of the pollutants present in exhaust gas, though historically such aftertreatment systems have not been added to diesel engines. However, to remove diesel particulate matter, typically a diesel particulate filter, herein referred to as a filter, must be installed downstream from a catalytic converter or in conjunction with a catalytic converter.

A common filter comprises a porous ceramic matrix with parallel passageways through which exhaust gas passes. Particulate matter accumulates on the surface of the filter, creating a buildup that must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, which is refractory and not easily wiped away, can be oxidized and driven off of the filter in an event called regeneration. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system that can impair engine performance. Particulate matter, in general, oxidizes in the presence of $NO_2$ at modest temperatures, or in the presence of oxygen at higher temperatures. Excessive soot buildup on the filter can precipitate uncontrolled regeneration of a particulate filter, or, in other words, cause rapid oxidation rates resulting in higher than designed temperatures within the filter. Recovery can be an expensive process.

To prevent potentially hazardous situations, it is desirable to oxidize accumulated particulate matter in a controlled regeneration process before it builds to excessive levels. To oxidize the accumulated particulate matter, temperatures generally must exceed the temperatures typically reached at the filter inlet. Oxidation temperatures will be achieved under normal operating conditions in some applications, although in others, additional methods to initiate regeneration of a diesel particulate filter must be used. In one method, a reactant, such as diesel fuel, is introduced into an exhaust aftertreatment system to generate temperature and initiate oxidation of particulate buildup in the filter. Partial or complete regeneration may occur depending on the duration of time the filter is exposed to elevated temperatures and the amount of particulate matter remaining on the filter. Partial regeneration, caused either by controlled regeneration or uncontrolled regeneration, can contribute to irregular distribution of particulate matter across the substrate of a particulate filter.

Controlled regeneration traditionally has been initiated at set intervals, such as distance traveled or time passed. Interval based regeneration, however, has not proven to be totally effective for several reasons. First, regenerating a particulate filter with little or no particulate buildup lessens the fuel economy of the engine and unnecessarily exposes the particulate filter to destructive temperature cycles. Second, if particulate matter accumulates significantly before the next regeneration, backpressure from blockage of the exhaust flow can negatively affect engine performance. In addition, regeneration (intentional or unintentional) of a particulate filter containing large quantities of particulate buildup can become uncontrolled and potentially cause filter failure or the like. Consequently, many particulate filters regenerated on a set interval must be replaced frequently to maintain the integrity of an exhaust gas after-treatment system.

Recently, attempts have been made to estimate the amount of particulate matter accumulated in a particulate filter in order to respond more efficiently to actual particulate buildup, such as, in one widely used method, through differential pressure across a diesel particulate filter. These attempts, however, often do not account for variations in engine operating conditions, sensor noise-to-measurement levels, exhaust flow estimate errors, and unevenly distributed particulate accumulation. In many cases they also integrate errors over time and deviate from real soot loading conditions.

From the foregoing discussion, it should be apparent that a need exists for an apparatus, system, and method that provide representative feedback based on combined input from a sensor and input from a calculated prediction, and to combine different inputs such that their combined output is useful. A need also exists for a way to determine the reliability of sensor-based and model-based inputs and weigh them accordingly. Beneficially, such an apparatus, system, and method would enable effective and timely regeneration of a diesel particulate filter based on a more accurate estimate of soot accumulation. In addition, the apparatus, system, and method would increase the fuel economy of a vehicle, extend the life expectancy of a diesel particulate filter, and increase the overall efficiency of an engine.

SUMMARY OF THE INVENTION

The present invention has been developed in response to the present state of the art, and in particular, in response to the problems and needs in the art that have not yet been fully solved by currently available filter soot accumulation feedback methods. Accordingly, the present invention has been developed to provide an apparatus, system, and method for determining and implementing the reliability of sensor feedback and combining that feedback with other inputs that overcome many or all of the above-discussed shortcomings in the art.

In one aspect of the invention, an apparatus is provided to determine the degree of reliability of an estimate of the status of a given mechanism or process. The apparatus includes a first estimator module, which is configured to determine a first estimate of the status. The first estimate is based on at least one existing condition, determined beforehand to be used thus, such as, in the case of estimating particulate on a diesel particulate filter, differential pressure across the filter.

The apparatus further includes a trust factor module, which is configured to determine the degree to which the first estimate is reliable.

A second estimator module is configured to determine a second estimate of the status. Like the first, the second estimate is based on a second existing condition. The trust factor module is configured to convert the first estimate into a weighted first estimate and the second estimate into a weighted second estimate, and a combination module combines the weighted first and second estimates into a combined estimate.

In one embodiment, the first and second estimator modules are configured to estimate the amount of particulate accumulation on a diesel particulate filter, with the reliability based on air flow at the filter and particulate distribution on the filter.

The trust factor module can be configured to determine a trust factor as well as a time constant, the time constant being based on the trust factor. The time constant is used in a first-order low-pass filter configured to filter the contribution of the first estimate to the final input value as a function of the time constant.

In a further aspect of the invention, a method for determining the status of a mechanism or process includes determining a prediction of the status, based at least partially on observed conditions, and determining an estimate of the status, also based at least partially on observed conditions. The method further includes determining a trust factor value which indicates the reliability of the estimate. A combined estimate is determined by combining the prediction and the estimate at least partially according to the trust factor value.

In one embodiment, when the method is used in connection with a diesel particulate filter, the trust factor is set according to the exhaust flow rate at the filter and the particulate distribution pattern on the filter. For example, the trust factor is set high when the exhaust flow rate and the particulate distribution uniformity are high. Likewise, the trust factor is set low when the exhaust flow rate and the particulate distribution uniformity are low.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
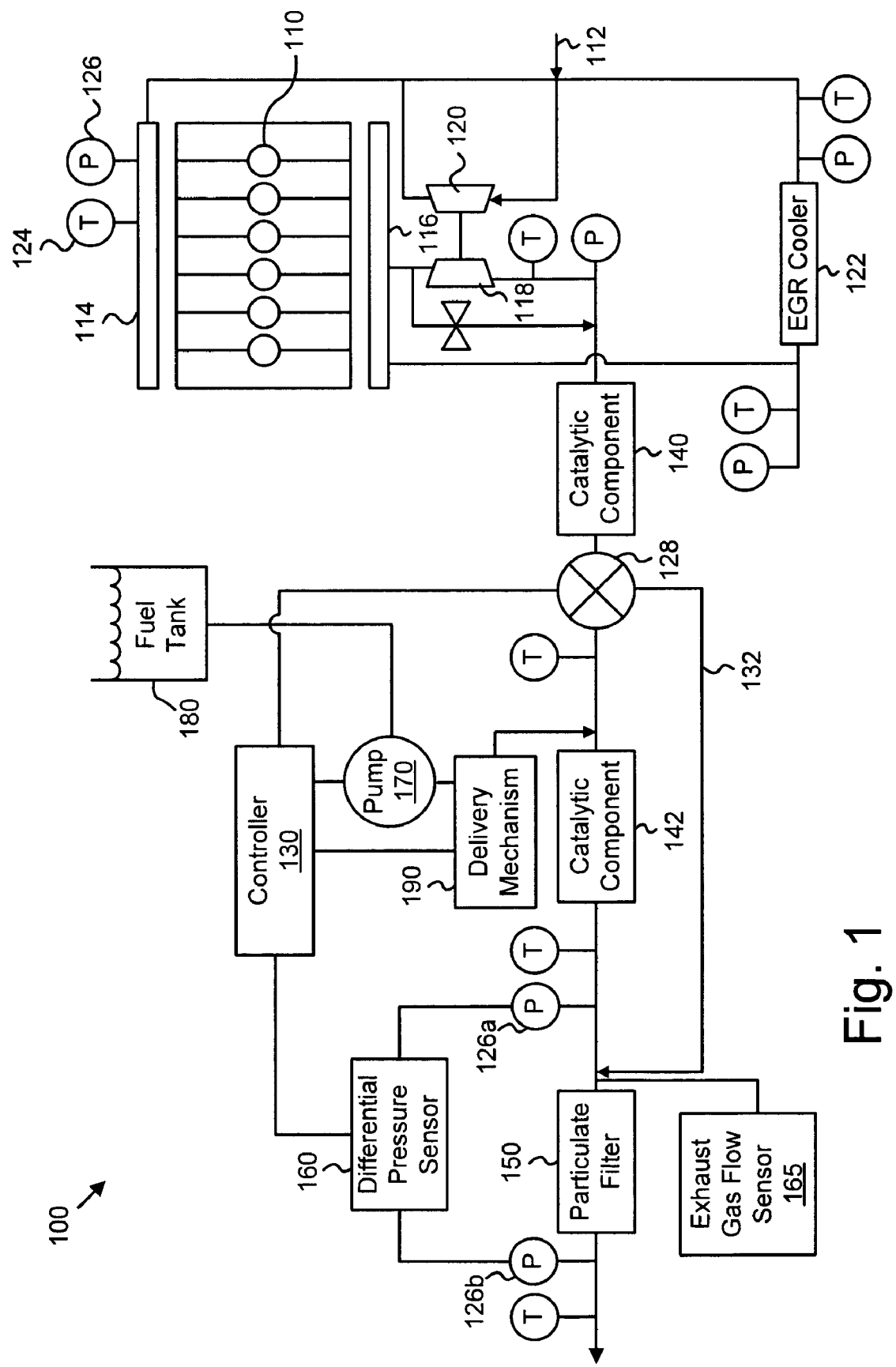
FIG. 1 is a schematic block diagram illustrating one embodiment of a diesel engine and exhaust gas after-treatment system according to the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 depicts one embodiment of an exhaust gas after-treatment system 100 in accordance with the present invention. The exhaust gas after-treatment system 100 maybe implemented in conjunction with an internal combustion engine 110 to remove various chemical compounds and particulates from emitted exhaust gas. As illustrated, the exhaust gas after-treatment system 100 may include the internal combustion engine 110, a controller 130, catalytic components 140, 142, a filter 150, a differential pressure sensor 160, an exhaust gas flow sensor 165, a reactant pump 170, a fuel tank 180, and a reductant delivery mechanism 190. Exhaust gas treated in the exhaust gas after-treatment system 100 and released into the atmosphere consequently contains significantly fewer pollutants, such as diesel particulate matter, nitrogen oxides, hydrocarbons, and carbon monoxide than untreated exhaust gas.

The exhaust gas after-treatment system 100 may further include an air inlet 112, an intake manifold 114, an exhaust manifold 116, a turbocharger turbine 118, a turbocharger compressor 120, an engine gas recirculation (EGR) cooler 122, temperature sensors 124, pressure sensors 126, air-flow sensors 156, and an exhaust gas system valve 128. In one embodiment, an air inlet 112 vented to the atmosphere enables air to enter the exhaust gas after-treatment system 100. The air inlet 112 may be connected to an inlet of the intake manifold 114. The intake manifold 114 includes an outlet operatively coupled to the compression chamber of the internal combustion engine 110. Within the internal combustion engine 110, compressed air from the atmosphere is combined with fuel and ignited to power the engine 110. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 is directed to the inlet of the exhaust gas after-treatment system valve 128. The exhaust gas may pass through multiple catalytic components 140, 142 and/or particulate filters 150 in order to reduce the number of pollutants contained in the exhaust gas before venting the exhaust gas into the atmosphere. Another portion of the exhaust gas may be re-circulated to the engine 110. In certain embodiments, the EGR cooler 122, which is operatively connected to the inlet of the intake manifold 114, cools exhaust gas in order to facilitate increased engine air inlet density. In one embodiment, an EGR valve 154 diverts the exhaust gas past the EGR cooler 122 through an EGR bypass 152.

Exhaust gas directed to the exhaust gas after-treatment system valve 128 may pass through a catalytic component 140, such as a hydrocarbon oxidation catalyst or the like, in certain embodiments. Various sensors, such as temperature sensors 124, pressure sensors 126, and the like, may be strategically disposed throughout the exhaust gas after-treatment system 100 and may be in communication with the controller 130 to monitor operating conditions.

The exhaust gas after-treatment system valve 128 may direct the exhaust gas to the inlet of another catalytic component 142, such as a nitrogen oxide adsorption catalyst or the like. Alternatively or in addition, a portion of the exhaust gas may be diverted through the system valve 128 to an exhaust bypass 132. The exhaust gas bypass 132 may have an outlet operatively linked to the inlet of a filter 150, which may comprise a catalytic soot filter in certain embodiments. Particulate matter in the exhaust gas, such as soot and ash, may be retained within the filter 150. The exhaust gas may subsequently be vented to the atmosphere.

In addition to filtering the exhaust gas, the exhaust gas after-treatment system 100 may include a system for introducing a reactant, such as fuel, into the exhaust gas or into components of the exhaust gas after-treatment system 100. The reactant may facilitate oxidation of various chemical compounds adsorbed within catalytic components 142 and may also facilitate regeneration of the filter 150. The fuel tank 180, in one embodiment, may be connected to the reactant pump 170. The pump 170, under direction of the controller 130, may provide fuel or the like to a reactant delivery mechanism 190, such as a nozzle, which may be operatively coupled to the inlet of the catalytic component 142 and/or the filter 150. The exhaust valve 128, reactant pump 170, and reactant delivery mechanism 170 may be directed by the controller 130 to create an environment conducive to oxidation of chemical compounds.

One method to regenerate at least one component of the exhaust gas after-treatment system 100, according to one embodiment, comprises periodically introducing reactant into the filter 150. The controller 130 directs the reactant pump 170 to deliver reactant to the reactant delivery mechanism 190. The controller 130 subsequently regulates the delivery mechanism 190 to deliver selected amounts of reactant into the filter 150. Between injections of reactant, the delivery mechanism 190 maybe closed and no additional reactant delivered directly to the filter 150. The effect of this sequence produces a series of injections of reactant into the inlet of the filter 150. As a result, the controller 130 may control the regeneration of the filter 150.

In certain embodiments, the exhaust gas after-treatment system 100 may be configured to determine an appropriate time to introduce reactant into the filter 150. Appropriate timing of regeneration may have one or more advantages, including contributing to an increase in the fuel economy of a vehicle, extended life expectancy of the filter 150, and increased overall efficiency of the engine 110.

One way of estimating the amount of particulate matter accumulated on a diesel particulate filter such as the filter 150 to determine whether regeneration has occurred or is needed is to use information regarding the pressure differential over the filter 150 as ascertained by a sensor or series of sensors such as the differential pressure sensor 160, and the rate of exhaust gas flowing from the engine as ascertained by a sensor or series of sensors such as the exhaust gas flow sensor 165.

Figure 2A:
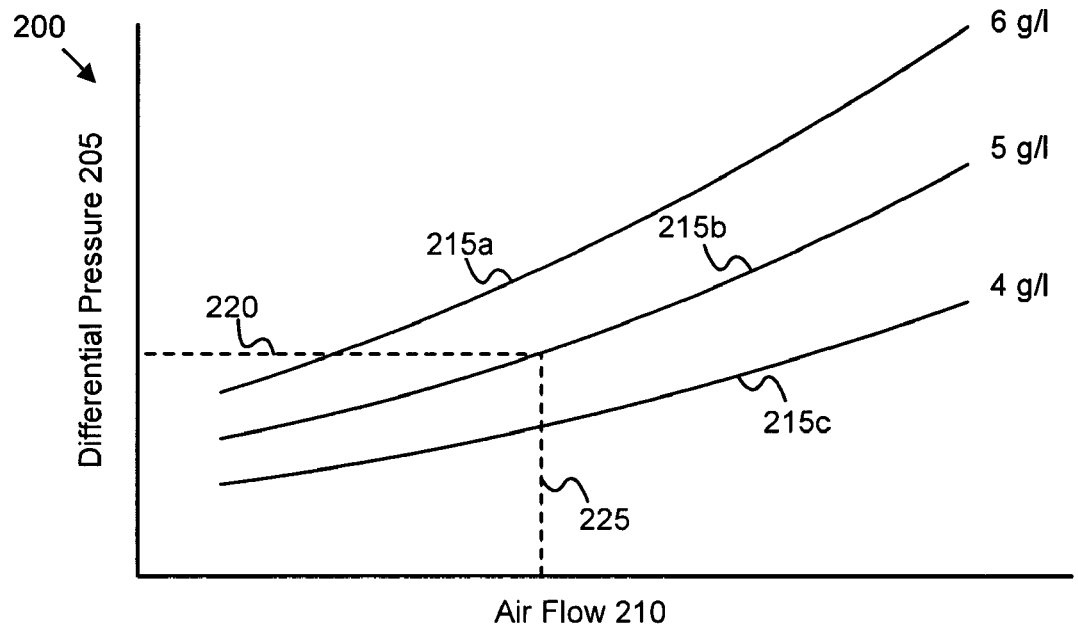
FIG. 2A is a graph illustrating one embodiment of a manner of determining particulate accumulation using differential pressure and air flow.

FIG. 2A is a graph illustrating one embodiment of a function 200 estimating the amount of particulate matter accumulated on a diesel particulate filter. The function 200 includes a plurality of particulate functions 215. Each particulate function 215 specifies a particulate accumulation based on known data from filters with particulate accumulation being essentially uniform across the filter. For example, a first particulate function 215a as depicted specifies a particulate accumulation of 6 grams of particulate per liter of filter 150 volume (6 g/l) while a second particulate function 215b specifies 5 g/l and a third particulate function 215c specifies 4 g/l.

Each particulate function 215 comprises a plurality of differential pressure 205 and exhaust gas or air flow 210 value pairs. In one embodiment, the differential pressure 205 value is a function of the air flow 210 value. In a certain embodiment, the differential pressure 205 value is a linear function of the air flow 210 value.

In the estimator function 200, the differential pressure value 220 and air flow value 225 are a value pair which together indicate a point on a single particulate function 215b. As depicted, the interpolation function yields a particulate accumulation of 5 g/l for the differential pressure value 220 and air flow value 225 pair, indicating that 5 g/l of particulate matter have accumulated on the filter 150.

Figure 2B:
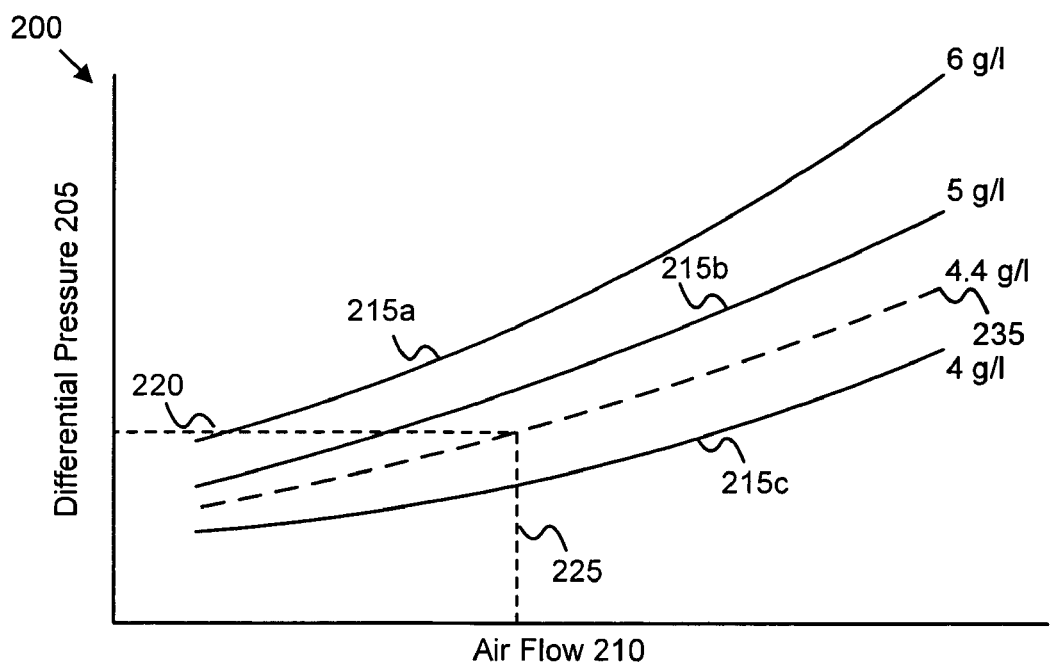
FIG. 2B is a graph illustrating another embodiment of a manner of determining particulate accumulation using differential pressure and air flow.

FIG. 2B is a graph illustrating one embodiment of a manner of estimating a particulate accumulation using an estimation or interpolation function 200 of the present invention. The interpolation function 200 may be the interpolation function of FIG. 2A with a specified differential pressure value 220 and a specified air flow value 225. The differential pressure value 220 and air flow value 225 pair do not indicate a point on any of the single particulate functions 215.

In the depicted embodiment, an interpolated particulate function 235 is interpolated from a second and third particulate function 215b and 215c. In an alternate embodiment, the interpolated particulate function 235 is interpolated from a single particulate function 215 such as the second or third particulate function 215b or 215c. The interpolated particulate function 235 contains the point indicated by the differential pressure value 220 and air flow value 225 pair.

A particulate accumulation is estimated from the interpolated particulate function 235. The particulate accumulation may be interpolated from the second and third particulate functions' 215b and 215c particulate accumulation values. As depicted, the particulate accumulation for interpolated particulate function 235 is 4.4 g/l.

In one embodiment, the particulate accumulation A for the interpolated particulate function 235 is calculated using Equation 1 where $P_1$ is the differential pressure value 220 for the air flow value 225, $A_1$ is the accumulation value of the third particulate function 215c, $A_2$ is the accumulation value of the second particulate function 215b, $P_1$ is the differential pressure value 250 of the air flow value 225 for the third particulate function 215c, and $P_2$ is the differential pressure value 245 of the specified air flow value 225 for the second particulate function 215b.

$$A = (A_2 - A_1)\left(\frac{P_1 - P_1}{P_2 - P_1}\right) + A_1 \qquad \text{(Equation 1)}$$

The accuracy of particulate accumulation estimates based on the function 200, using air flow 210 and differential pressure 205 across the filter depend on the air flow rate through the diesel particulate filter, uniformity of particulate accumulation across the filter, and other factors. For example, at low air flow rates sensor signal-to-noise ratios become unacceptably large and the estimate becomes increasingly unreliable. In addition, if the particulate accumulation across the filter is not evenly distributed, such as often occurs after a partial regeneration event, the single particulate function 215 becomes skewed. Typically, this skewing will involve the filter exhibiting very low differential pressures at low flow rates, and a higher slope of differential pressure versus flow rate 215d of FIG. 2C, as compared to the uniformly distributed case 215a.

Further details of differential pressure/air flow-based particulate-matter estimates are contained in the related patent application titled "APPARATUS, METHOD, AND SYSTEM FOR ESTIMATING ASH ACCUMULATION," Ser. No. 11/227,828, incorporated herein by reference.

Figure 2C:
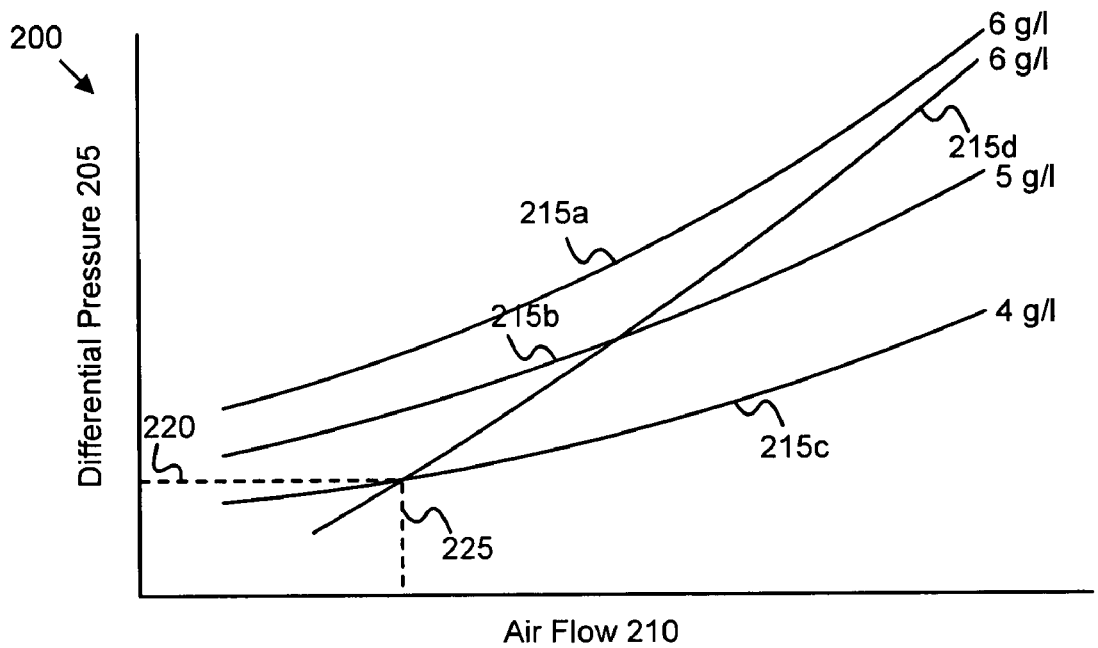
FIG. 2C is a graph illustrating the limitations of determining particulate accumulation using differential pressure and air flow when the particulate accumulation is maldistributed.

FIG. 2C illustrates the problems associated with estimating the total amount of particulate matter on the filter 150 when the particulate matter is maldistributed. Single particulate function 215d illustrates a typical relationship between differential pressure 205 and air flow 210 when particulate matter is maldistributed. Even though the filter 150 contains the same amount of particulate matter, 6 g/l, in single particulate function 215d, when the particulate matter is maldistributed, as it does in single particulate function 215a, the functions differ in slope and placement, creating problems in accurately estimating the total amount of particulate matter. The air flow 225 and differential pressure 205 value pair shown in FIG. 2C, for example, constitute a point on single particulate function 215c, indicating that the filter contains 4 g/l of particulate matter. If the particulate matter is maldistributed, however, that estimate is inaccurate—rather, the air flow 225 and differential pressure 205 value pair indicate 6 g/l of particulate matter on the filter, as shown by single particulate function 215d.

There are other ways of estimating or predicting particulate matter accumulation on diesel particulate filters, each with its own advantages and disadvantages. For example, a model may be created to predict particulate accumulation based on operating conditions including fueling rate, engine speed, engine load, the angle at which timing crank is advanced or retarded, degree of exhaust gas recirculation, time passed, driving conditions, whether and when regenerations have occurred and the rate such regenerations have removed particulate matter, etc. Particulate matter accumulation prediction models are further discussed in related applications "APPARATUS, SYSTEM, AND METHOD FOR ESTIMATING PARTICULATE PRODUCTION," Ser. No. 11/227,857, and "APPARATUS, SYSTEM, AND METHOD FOR ESTIMATING PARTICULATE CONSUMPTION," Ser. No. 11/227,403, incorporated herein by reference.

Figure 3:
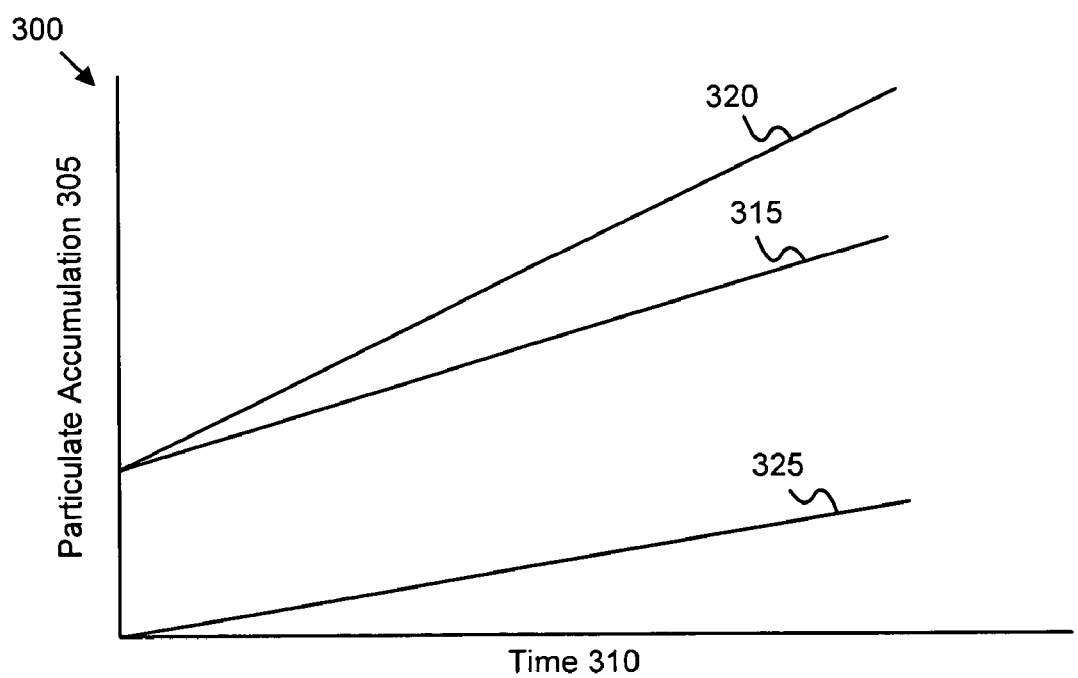
FIG. 3 is a graph illustrating a difference between soot-load estimate prediction models and actual soot load over time.

FIG. 3 depicts a function 300 of general particulate accumulation 305 over time 310. Single particulate accumulation function 315 illustrates the actual particulate accumulation on a filter over time, while single particulate function 320 illustrates one embodiment of a prediction of particulate accumulation on a filter over time using a model. Single particulate accumulation function 325 illustrates the error between predicted particulate accumulation 320 and actual particulate accumulation 315 over time. As can be seen in FIG. 3, prediction models are useful primarily for a period of time after the soot loading is known with a reasonably high confidence level, such as after a "deep clean" event. Over time, however, the error 325 between the predicted and actual particulate accumulation 320 and 315 grows larger, making the predicted particle accumulation 320 less reliable over time.

Particulate accumulation prediction models vary in their operating parameters and methods of calculation, meaning they also vary in their results. A general rule for any prediction model, however, is that as time increases so does the prediction model's unreliability. Depending on the prediction model, other conditions also impact the model's reliability.

Figure 4:
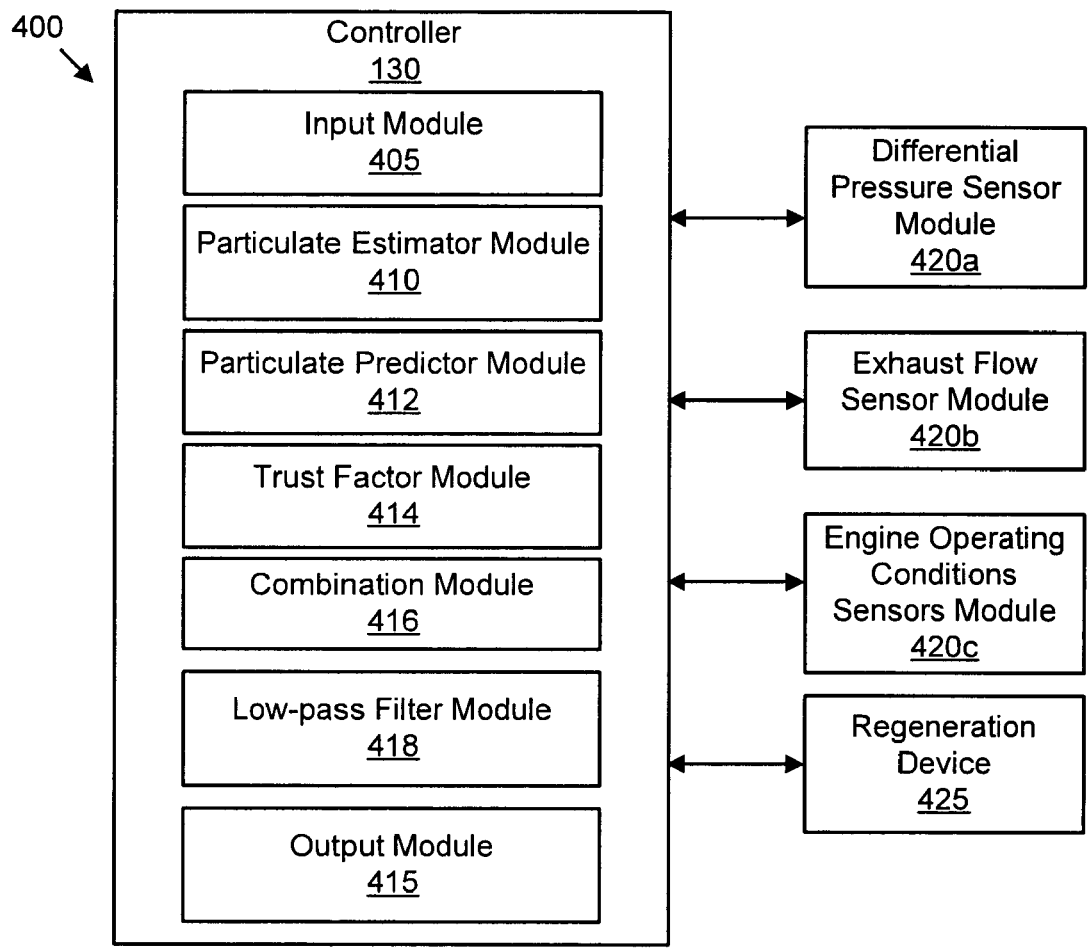
FIG. 4 is a schematic block diagram illustrating one embodiment of a control system according to the present invention.

FIG. 4 illustrates one embodiment of a control system 400 in accordance with the present invention. As depicted, the system 400 may include a controller 130, one or more sensor modules 420—in this case a differential pressure sensor module 420a, an exhaust flow sensor module 420b, and engine operating conditions sensor module 420c—and a regeneration device 425. The controller 130 may include an input module 405, a particulate estimator module 410, a particulate predictor module 412, a trust factor module 414, a combination module 416, a low-pass filter module 418, and an output module 415.

The controller 130 may be the controller 130 of FIG. 1. The input module 405 of the controller 130 may receive input from the sensor modules 420. The sensor modules 420 may include the temperature sensors 124, pressure sensors 126, air-flow sensors 156, and differential pressure sensor 160 of FIG. 1.

In one embodiment, the differential pressure sensor module 420a determines a differential pressure across the filter 150. The sensor module 420a comprises a differential pressure sensor 160 of FIG. 1 with a first pressure sensor such as a pressure sensor 126a disposed upstream of the filter 150 and a second pressure sensor 126b disposed downstream of the filter 150. The differential pressure sensor module 420a may calculate the differential pressure as the difference in pressure between the first and second pressure sensors 126a and 126b. In an alternate embodiment, the differential pressure sensor module 420a estimates the differential pressure from a single pressure sensor (not shown).

In one embodiment, the exhaust flow sensor module 420b is an air-flow sensor that determines an air flow through the filter 150. In one embodiment, the exhaust flow sensor module 420b measures the air flow using a sensor such as exhaust gas flow sensor 165. In an alternate embodiment, the exhaust flow sensor module 420b estimates the air flow from one or more related parameters such as fuel consumption or engine speed.

In one embodiment, the engine operating conditions sensor module 420c comprises one or more sensors on or around a diesel engine, exhaust gas systems, and related machinery, returning information regarding, for example, fueling rate, engine speed, engine load, the angle at which injection timing is advanced or retarded, time passed, degree of exhaust gas recirculation, driving conditions, whether and when regenerations have occurred, and the rate at which such regenerations have removed particulate matter, etc.

In one embodiment, the particulate estimator module 410 is configured to estimate the particulate accumulations—ash and soot—in a diesel particulate filter such as the filter 150 of FIG. 1, using inputs from the differential pressure sensor module 420a and the exhaust flow sensor module 420b. Using engine operating conditions inputs, the particulate predictor module 412 is configured to predict the particulate accumulation in a diesel particulate filter such as the filter 150 of FIG. 1.

In one embodiment, the trust factor module 414 is configured to generate a trust factor or reliability determiner of the particulate estimate generated by the particulate estimator module 410, as further detailed below.

In one embodiment, the combination module 416 generates a combined value by combining the estimate generated by the particulate estimator module 410 and the prediction generated by the particulate predictor module 412. The combination module 416 uses the trust factor generated by the trust factor module 414 as a guide to how it combines the estimate and prediction. For example, it may use only a percentage of the estimate, proportionate to its reliability as indicated by the trust factor value, combining it with an appropriate percentage of the prediction to generate the combined value. If the trust factor indicates that the estimate's reliability is very low, the combination module 416 may use proportionately much more or all of the prediction relative to the estimate to determine the combined value. If the trust factor indicates that the estimate's reliability is very high, the combination module 416 may use proportionately much more or all of the estimate relative to the prediction to determine the combined value. Other combinations of the estimate and prediction using the trust factor are possible.

The low-pass filter module 418 may be configured to dampen output from the differential pressure sensor module 420a to correct for statistical or other aberrations, using a filter function.

The output module 415 may be configured to control one or more devices such as the regeneration device 425. In one embodiment, the regeneration device 425 comprises the reactant pump 170, reactant delivery mechanism 190, exhaust gas system valve 128, and exhaust bypass 132 of FIG. 1. In one embodiment, the output module 415 controls the regeneration device 425 in response to the combination module 416.

As is known in the art, the controller 130 may comprise processor, memory, and interface modules that may be fabricated of semiconductor gates on one or more semiconductor substrates. Each semiconductor substrate may be packaged in one or more semiconductor devices mounted on circuit cards. Connections between the modules may be through semiconductor metal layers, substrate-to-substrate wiring, or circuit card traces or wires connecting the semiconductor devices.

Figure 5:
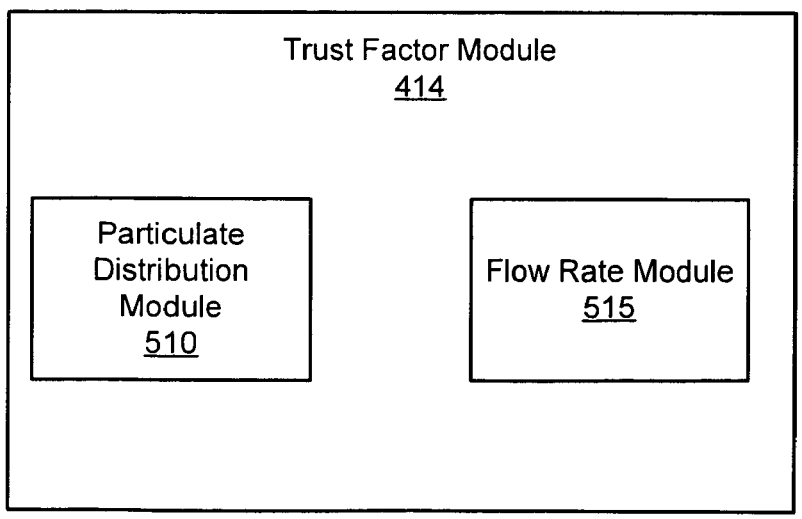
FIG. 5 is a schematic block diagram illustrating one embodiment of the trust factor module of FIG. 4.

FIG. 5 is a schematic block diagram illustrating one embodiment of a trust factor module 414 according to the invention. The trust factor module 414 may be the trust factor module 414 of FIG. 4. As depicted, the trust factor module 414 includes a particulate distribution module 510 and a flow rate module 515. The particulate distribution module 510 determines the distribution of particulate matter on the diesel particulate filter 150, i.e., whether it is uniformly distributed or maldistributed, and if the latter, to what extent the filter 150 is maldistributed, as further detailed in the related application titled "APPARATUS, SYSTEM, AND METHOD FOR DETERMINING THE DISTRIBUTION OF PARTICULATE MATTER ON A PARTICULATE FILTER," Ser. No. 11/226,972, incorporated herein by reference.

The flow rate module 515 determines the rate of flow of exhaust gas or air through or coming into the filter 150, using information gathered from the exhaust gas flow sensor 165 or other inputs. In one embodiment, the trust factor module 414 determines a trust factor based on the determinations of modules 510 and 515.

Figure 6:
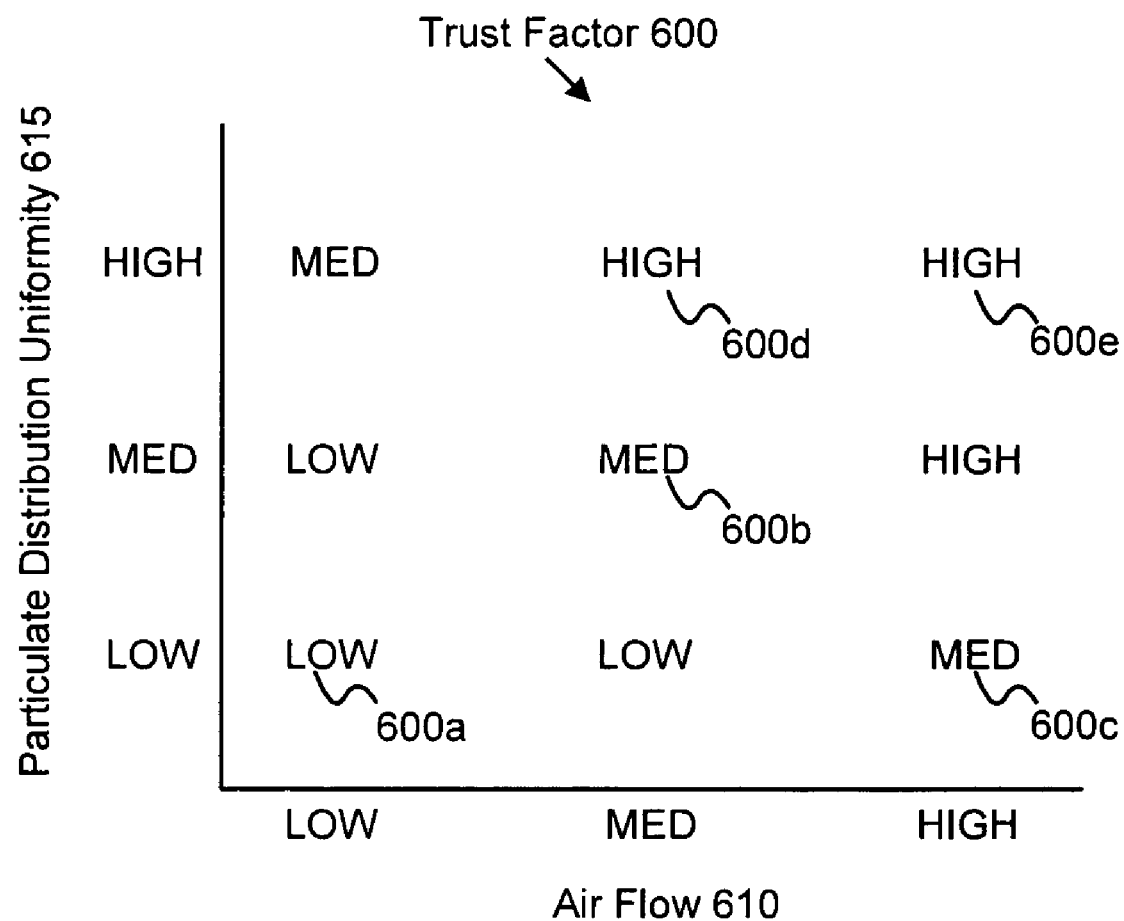
FIG. 6 is a chart illustrating one embodiment of a trust factor determination.

Referring now to FIG. 6, a chart is shown illustrating one embodiment of a manner of determining the reliability of an estimate of the amount of particulate accumulation on a diesel particulate filter, such as the filter 150, based on differential pressure. Generally, a differential pressure-based particulate estimate becomes more reliable as air flow 610 through or into the filter 150 increases, decreasing the signal-to-noise ratio and ensuring that the flow regime is revealing the wall flow pressure drop characteristics of the particulate filter. Likewise, the estimate generally becomes less reliable with lower air flows 610.

For example, in a current 15-liter engine with a 22-liter filter, it has been determined that the differential pressure-based estimate can be considered unreliable below an air flow rate of 400 ACFM, and reliable, when the soot layer is uniformly distributed, above 1000 ACFM.

Another factor in the reliability of differential pressure-based filter particulate amount estimates is the uniformity of particulate distribution 615 on the filter 150, as discussed in connection with FIG. 2C, with the estimate becoming less reliable as particulate accumulation on the filter becomes less uniformly distributed, and the estimate becoming more reliable as particulate accumulation on the filter becomes more uniformly distributed.

These two influences, air flow 610 and particulate distribution uniformity 615, may be used to determine a trust factor 600, which in one embodiment constitutes a measure of reliability of a differential pressure-based particulate estimate. In one embodiment, as shown in FIG. 6, when air flow 610 is low and distribution uniformity 615 is low (indicating a badly maldistributed accumulation), the trust factor 600a is low, indicating that a differential-pressure estimate of particulate matter on the filter 150 is untrustworthy. When air flow 610 and distribution uniformity 615 are medium, the trust factor 600b is medium, and when air flow 610 and distribution uniformity 615 are high (distribution is completely or nearly uniform), the trust factor 600e is high.

It can be seen in FIG. 6 that higher air flow 610 can make up for lower distribution uniformity 615, and vice versa. Even if distribution uniformity 615 is low, a high air flow 610 can raise the trust factor 600c to medium. If the air flow 610 is only medium, a high distribution uniformity 615 can raise the trust factor 600d to high.

In one embodiment, the influence of the air flow 610 and distribution uniformity 615 in determining the trust factor 600 is based on empirical evidence. In other embodiments, theoretical calculations may be used. Additionally, air flow 610 and uniformity 615 may not be the only factors influencing the degree to which a differential-pressure estimate of particulate accumulation can be trusted. Additional factors can be brought to bear in helping ascertain a trust factor 600, according to empirical evidence gathered in the lab or in the field.

Figure 7:
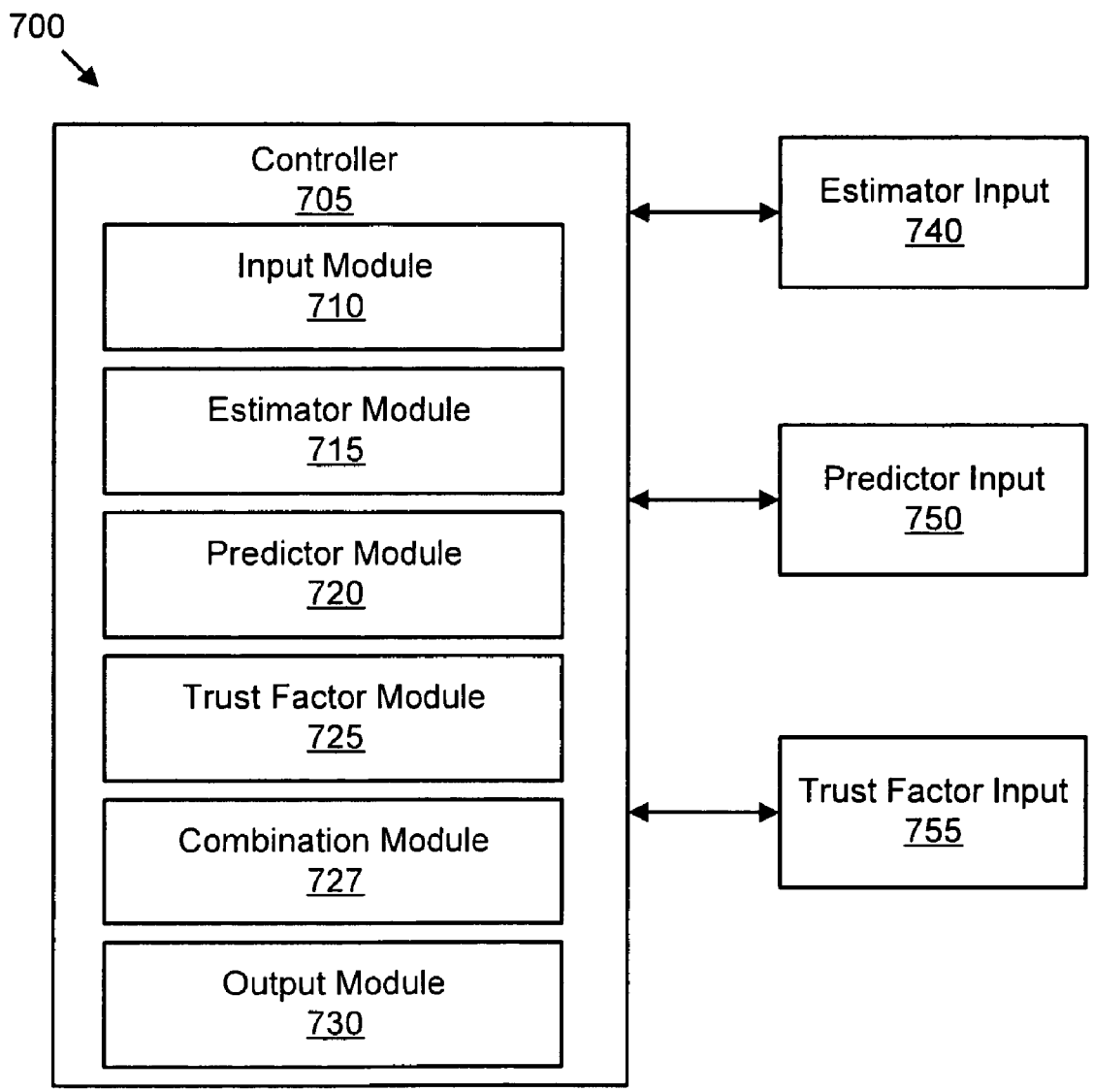
FIG. 7 is a schematic block diagram illustrating another embodiment of a control system according to the present invention.

Referring to FIG. 7, the use of a trust factor or reliability determiner to ascertain the reliability of an estimate can be used in any apparatus, system, or method where a condition or situation cannot be directly measured but must be estimated and/or predicted given theoretical considerations and/or current conditions. FIG. 7 illustrates one embodiment of such a control system 700 in accordance with the present invention. As depicted, the system 700 includes a controller 705, estimator input 740, predictor input 750, and trust factor input 755. The controller 705 includes an input module 710, an estimator module 715, a predictor module 720, a trust factor module 725, a combination module 727, and an output module 730.

The inputs 740, 750, and 755 determine conditions or factors that are used by the estimator, predictor, and trust factor modules 715, 720, and 725. The input module 710 inputs the information generated by the inputs 740, 750, and 755. The estimator module 715 uses the information from the estimator input 740 to generate an estimate, while the predictor module 720 uses the information from the predictor input 750 to make a prediction. Alternatively, the predictor module 720 can comprise another estimator module. The trust factor module 725 uses the information from the trust factor input 755 to determine the reliability of the estimate, and the combination module 727 determines a combined value by combining the estimate and prediction according to the reliability of the estimate indicated by the trust factor. The output module 730 outputs the combined value.

Figure 8:
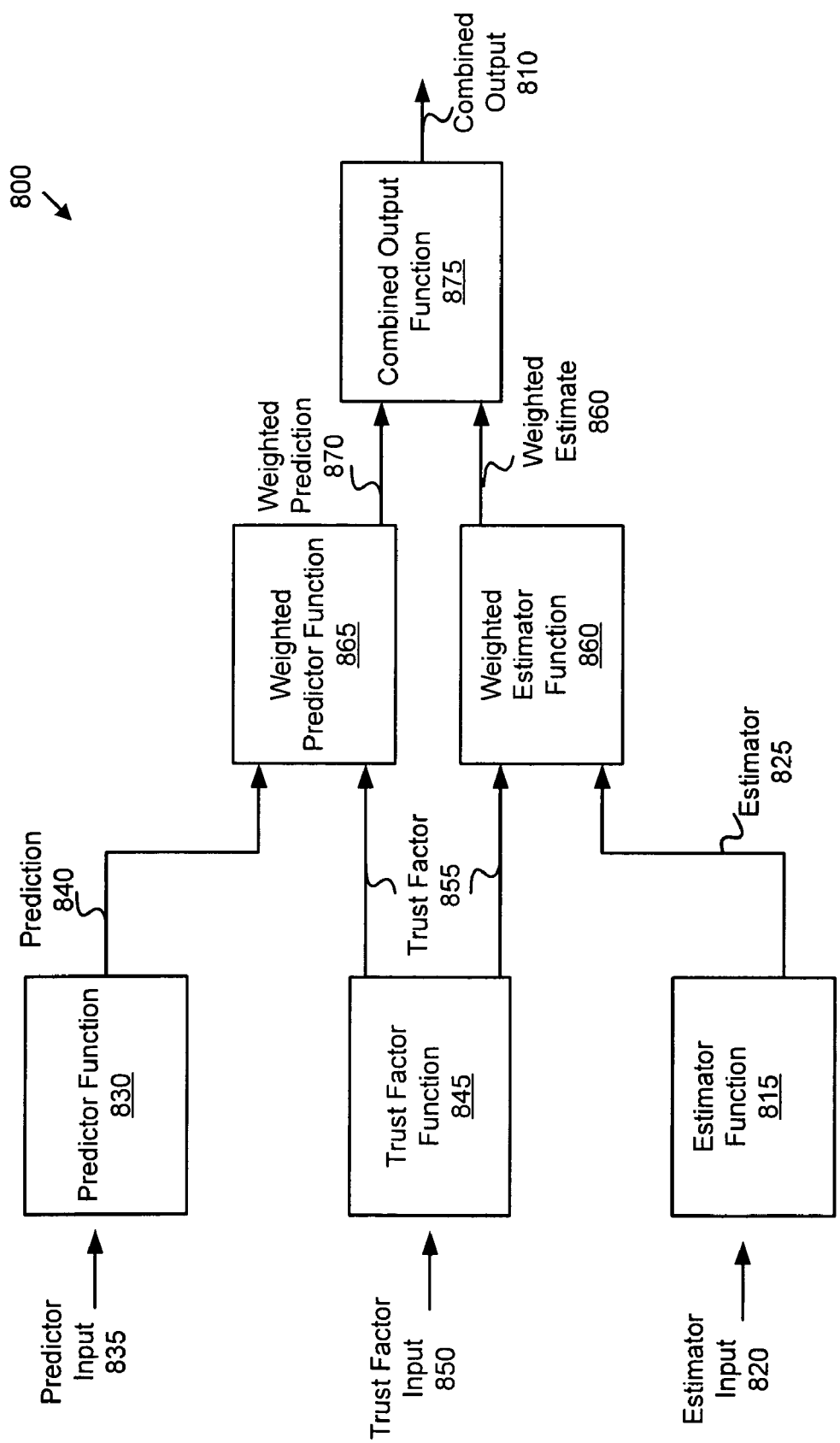
FIG. 8 is a chart illustrating one embodiment of a method of determining a combined output value according to the present invention.

FIG. 8 illustrates one embodiment of a method 800 of determining a combined output value 810 according to the invention, used when a condition or situation cannot be directly measured. In one embodiment, the method 800 depicts stored values and functions employed by the modules in the control system 700.

In FIG. 8, an estimator function 815 receives estimator input 820 from sensors and the like that indirectly measure the condition or indicate the state of the condition indirectly, using the input 820 to generate an estimate 825 of the condition. A predictor function 830, comprising in an alternative embodiment a second estimator function, receives predictor input 835 that may comprise sensor information, theoretical calculations, or other data that informs the predictor function 830 sufficiently to generate a prediction 840 regarding the condition.

The estimator function 815 may comprise a differential pressure-based estimate. For example, the predictor function 830 may comprise an estimate of the rate at which soot is collecting on the filter based on the rate of soot produced by the engine and the rate at which soot is oxidizing off the filter, as further detailed in related patent application Ser. No. 11/227,857, "APPARATUS, SYSTEM, AND METHOD FOR ESTIMATING PARTICULATE PRODUCTION," and related patent application Ser. No. 11,227,402, "APPARATUS, SYSTEM, AND METHOD FOR ESTIMATING PARTICULATE CONSUMPTION," each of which are incorporated herein by reference.

A trust factor function 845 receives trust factor input 850 and generates a trust factor 855 indicating the reliability of the estimate 825. A weighted estimate function 860 gives the estimate 825 a degree of weight according to the degree of reliability accorded it by the trust factor 855, and generates a weighted estimate 860. A weighted predictor function 865 gives the prediction 840 a degree of weight informed by the degree of reliability accorded the estimate 825 by the trust factor 855, and generates a weighted prediction 870. A combined output function 875 combines the weighted estimate 860 and weighted prediction 870 and generates a combined output 810.

With regard to diesel particulate filters in particular, a trust factor calculated according to the present invention can be used in various ways, including giving more or less weight to a differential pressure-based estimate of soot accumulation. Even when the differential pressure sensor is in an area of relatively low confidence, the longer it continues to indicate a particular value of soot loading the greater the chances that the indicated soot loading is actually a correct soot loading.

The actual soot loading from the differential pressure sensor may be seen to be clouded in a statistical haze, but the longer the haze stays in one spot, one can say with more confidence that the center of the haze is the correct answer. To allow the controls to embody this concept, the trust factor 855 is converted to a time constant. In the absence of any input from the predictor function 830, this time constant is selected in one embodiment of the time that it would take a beginning soot loading value to move about 63 percent of the way from the beginning value to the value indicated by the differential pressure estimate. For example, if the beginning soot value were 100 grams of soot and the differential pressure sensor indicated 200 grams of soot while the time constant was 5 seconds, then, ignoring any input from the predictor function 830, the soot value would change from 100 grams to 163 grams in 5 seconds. Therefore, this time constant is used as a standard low pass filter time constant as regards the differential pressure estimate.

Figure 9:
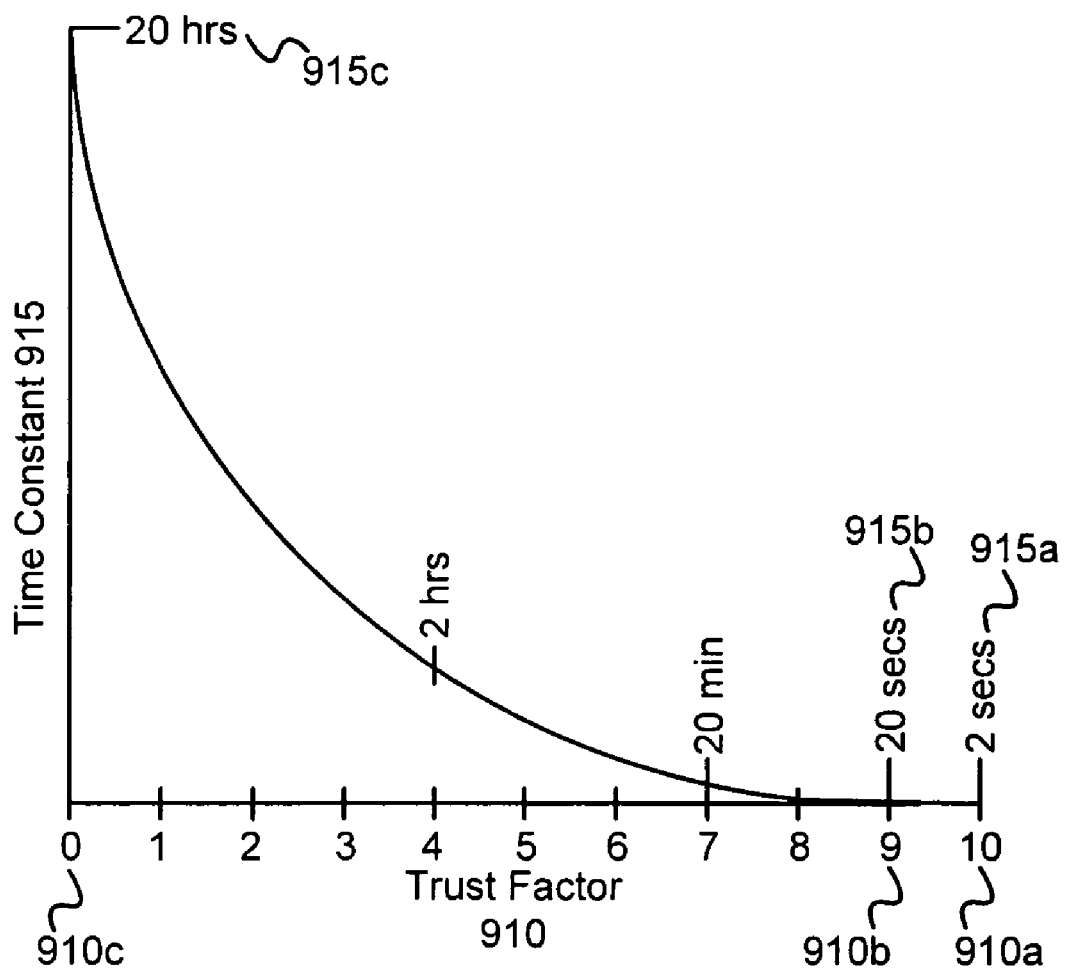
FIG. 9 is a graph illustrating one embodiment of a trust factor time constant determination according to the present invention.

FIG. 9 is a chart depicting one embodiment of conversion of a trust factor 910 to a time constant 915 for use in a first-order low-pass filter of a differential pressure-based particulate accumulation estimate, based on information provided by the differential pressure sensor 160. In one embodiment, the time constant 915 is an indication, based on empirical evidence, of how long it would take to trust a particular differential-pressure estimate as an accurate reflection of particulate accumulation across the filter 150 should that estimate be duplicated repeatedly over time. In one embodiment, as the reliability of the estimate decreases the trust factor 910 decreases and the time constant 915 increases.

The non-linear trust factor 910/time constant 915 function shown in FIG. 9 has been generated from evidence gathered from research and experience regarding what time constants 915 are most useful in a low-pass filter. These values will depend upon engine and particulate filter sizing, turbomachinery, designed emissions levels, and other system parameters. They can be determined for a particular system by determining how long a value must be indicated at a given level of trust factor before the signal is statistically meaningful. Other methods of conversion or conversions that are quantitatively different are within the scope of the present invention and will be apparent to those skilled in the art.

In FIG. 9, a trust factor 910 has a minimum of zero (indicating the lowest amount of trust in the differential-pressure estimate) and a maximum of 10 (indicating the highest amount of trust in the differential-pressure estimate).

As shown, in one embodiment a trust factor value 910*a* of 10 corresponds to a time constant value 915*a* of 2 seconds. A trust factor value 910*b* of 9 corresponds to a time constant value 915*b* of 20 seconds, and so on to a trust factor value 910*c* of zero corresponding to a time constant value 915*c* of 20 hours.

Figure 10:
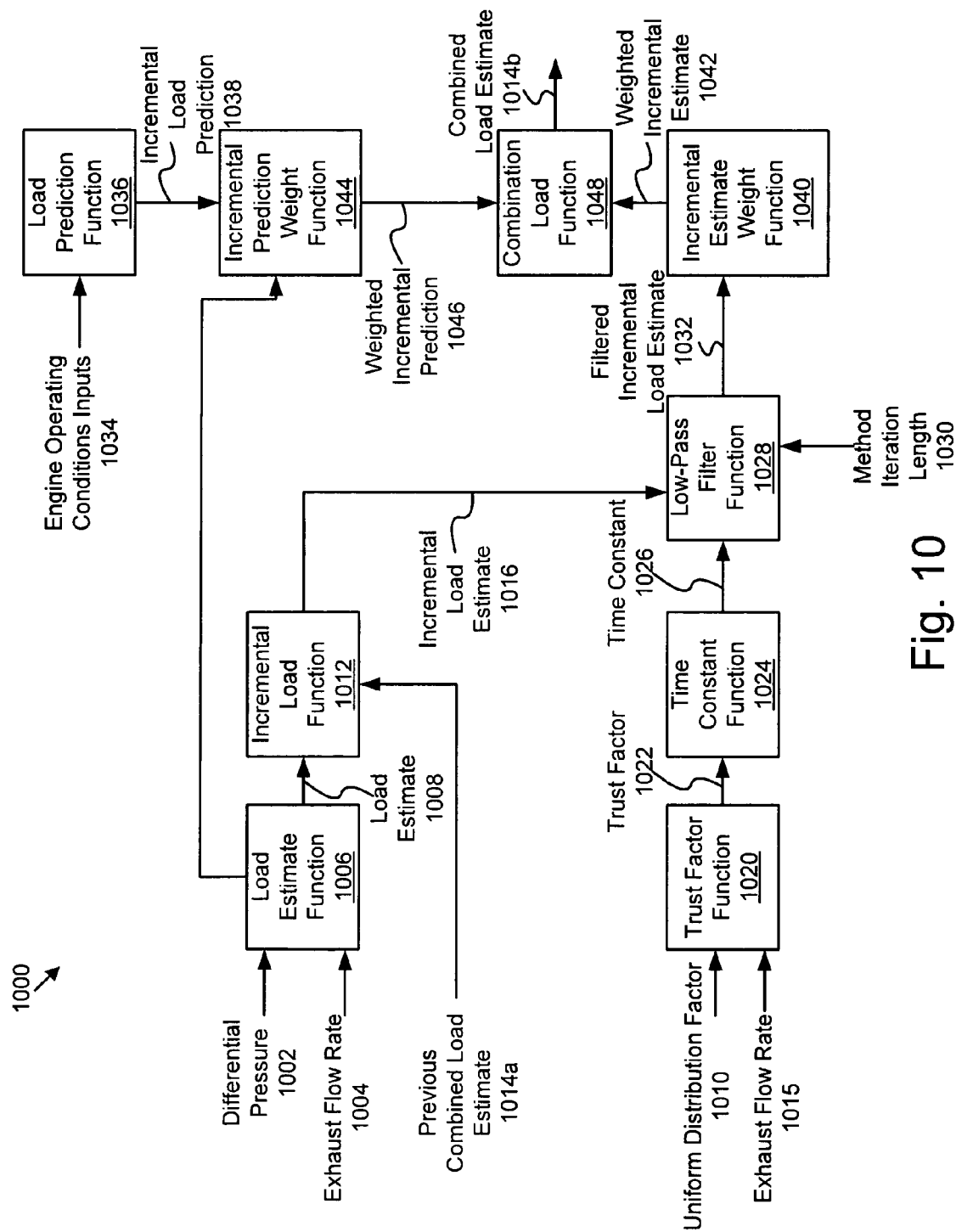
FIG. 10 is a chart illustrating one embodiment of a method of determining a combined soot load estimate according to the present invention.

FIG. 10 illustrates one embodiment of a method 1000 for determining as accurately as possible the total particulate load accumulated on a diesel particulate filter 150. In one embodiment, the method 1000 depicts stored values and functions employed by the modules in the control system 400. The method repeatedly generates a combined particulate load estimate 1014*b* at a given iteration rate, 5 Hz in one embodiment, with the estimate 1014*b* being used to determine whether regeneration of the filter 150 should be initiated.

In the method 1000, a differential pressure value 1002 generated by the differential pressure sensor 160 and an exhaust flow rate value 1004 generated by the exhaust gas flow sensor 165 are inputs to a particulate load estimate function 1006, which determines a particulate accumulation or load estimate 1008. The estimate 1008 estimates the total particulate load on the filter 150. An incremental particulate load function 1012 subtracts the last known or estimated particulate load on the filter 150 (in one embodiment, the combined particulate load estimate 1014*a* last generated by the method 1000), from the particulate load estimate 1008 to determine an incremental particulate load estimate 1016.

A uniform distribution factor 1010, indicating the degree of particulate accumulation uniformity across the filter 150, and an exhaust flow rate 1015 are inputs to a trust factor function 1020. The trust factor function 1020 calculates a trust factor 1022 indicating the reliability of the particulate load estimate 1008, in one embodiment, ranging from zero for very low reliability to 10 for very high reliability. A time constant function 1024 converts the trust factor 1022 to a time constant 1026 according to the chart of FIG. 9.

A first-order low-pass filter function 1028 dampens the incremental particulate load estimate 1016 using the time constant 1026 and the method iteration length 1030, i.e., the time between iterations of the method. For example, if the method iteration rate is 5 Hz, the method iteration length is 0.2 seconds. The filter function 1028 determines a filtered incremental particulate load estimate 1032 according to the following formula:

$$(F)\frac{T}{L} = \ln\left(1 - \frac{1}{e}\right) \times E \approx 0.632 \times E \quad \text{(Equation 2)}$$

The formula solving $$F = e^{\left(\frac{L}{T} \times \ln(0.632 \times E)\right)} \quad \text{(Equation 3)}$$

where F is the filtered incremental particulate load estimate 1032, E is the incremental particulate load estimate 1016, T is the time constant 1026, and L is the method iteration length 1030. When T=L, Equation 2 degenerates to the change associated with one time constant each execution step, or about 63 percent of the final change.

Therefore, with the incremental particulate load estimate (E) of 100 grams, a time constant (T) of 30 seconds, and a method iteration length (L) of 0.2 seconds, Equation 3 yields an F of 0.42 grams, while the more rigorous approach yields an F of 1.02 grams. When this is integrated over a 30 second period, the accumulated soot from the function would be 63.2 grams.

An incremental estimate weight function 1040 determines a weighted incremental estimate 1042 by multiplying the filtered incremental load estimate 1032 by the ratio of the trust factor 1026 to the maximum trust factor. For example, if the trust factor 1026 were 0.5 (on a scale of zero to 1), and the filtered incremental load estimate 1032 were 2.2 grams of particulate matter, the weighted incremental estimate 1042 would be 1.1 grams.

A particulate load prediction function 1036 inputs engine operating condition inputs 1034, including in one embodiment one or more of the following: fueling rate, engine speed, engine load, the angle at which timing crank is advanced or retarded, degree of exhaust gas recirculation, time passed, driving conditions, whether and when regenerations have occurred and the rate such regenerations have removed particulate matter. Using the input conditions 1034, the prediction function 1036 predicts the rate at which particulates are accumulating on the filter 150, and generates an incremental particulate load prediction 1038.

A prediction weight function 1044 determines a weighted incremental prediction 1046 by multiplying the incremental load prediction 1038 by the trust factor 1026. For example, if the trust factor 1026 were 0.5 (on a scale of zero to 1), and the incremental load prediction 1038 were 1.0 grams of particulate matter, the weighted incremental prediction 1046 would be 0.5 grams.

A combination load function 1048 determines a combined load estimate by adding the weighted incremental estimate 1042 to the weighted incremental prediction 1046 and correcting for the trust factor 1026 (done by, for trust factors 1026 using zero as a minimum, multiplying the sum by the maximum trust factor 1026). Since the result is an estimate of incremental particulate accumulation only, it is added to the previous combined load estimate 1014a to determine the total combined load estimate 1014b.

The combined load estimate 1014b thus is a combination of differential-pressure particulate load estimate and particulate load prediction based on operating conditions, the influence of each depending on the degree of reliability of the particulate load estimate as indicated by the trust factor.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 11:
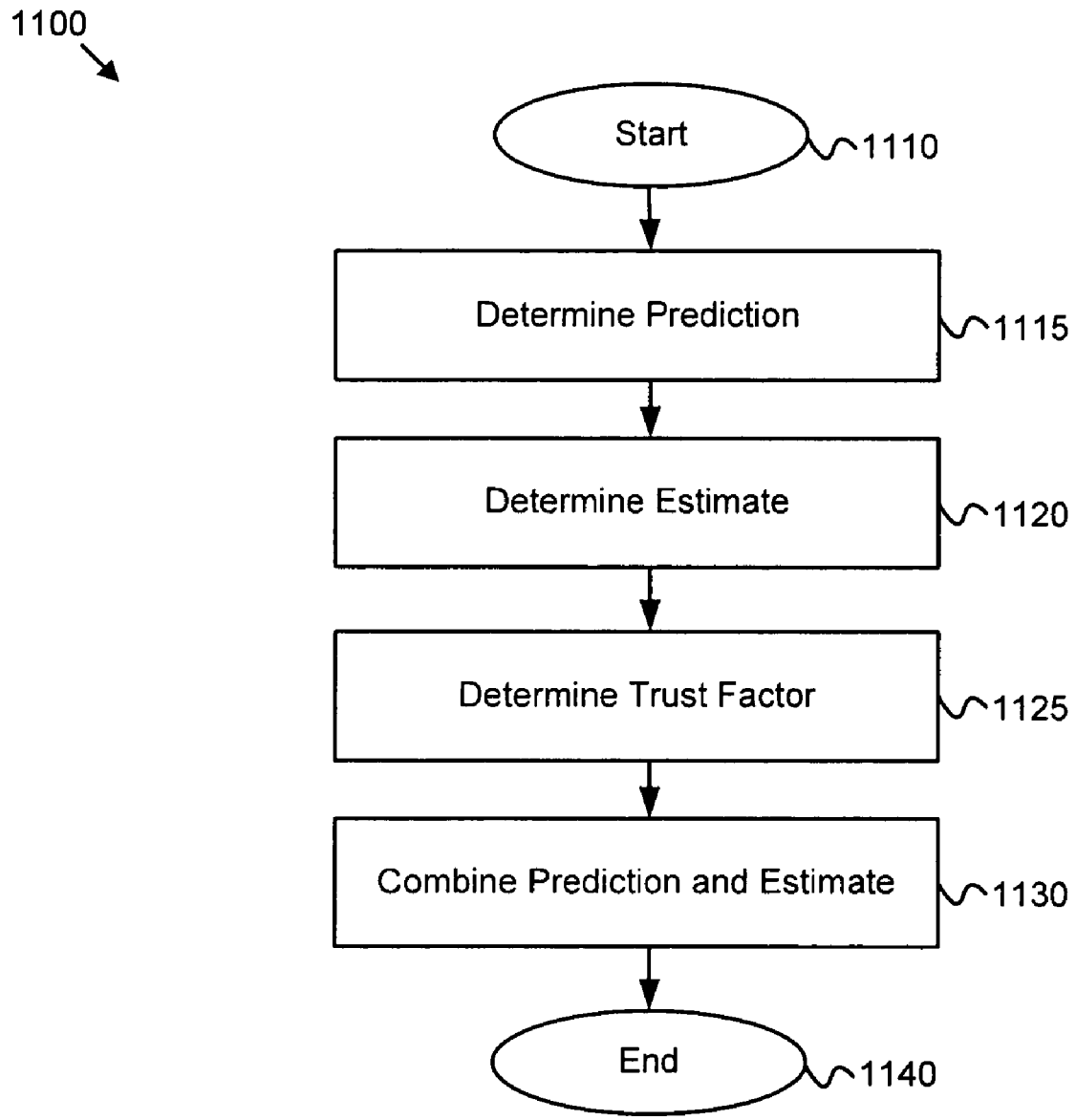
FIG. 11 is a schematic flow chart diagram illustrating one embodiment of a method of determining a combined output value according to the present invention.

FIG. 11 is a schematic flow chart diagram illustrating one embodiment of a method 1100 of determining a combined output value according to the invention, used when a condition or situation cannot be directly measured. In one embodiment, the method 1100 depicts stored values and functions employed by the modules in the control system 700.

The method 1100 begins 1110, and the predictor module 720 determines a prediction (or alternatively, an estimate) of the condition 1115 using input received from the predictor input module 740. The estimator module 715 estimates the condition 1120 using input received from the estimator input module 740. The trust factor module 725 determines a trust factor 1125 that reflects the reliability of the estimate determined by the estimator module 715 in one embodiment—in other embodiments, the trust factor may reflect, e.g., the reliability of the prediction—using input received from the trust factor input module 755. The combination module 727 combines the prediction and the estimate 1130 according to the reliability of the estimate, and the method ends 1140.

Any number of estimates or predictions may be used in the method 1100 while remaining within the scope of the invention, with the trust factor determining the reliability of one or more of the estimates or predictions.

Figure 12:
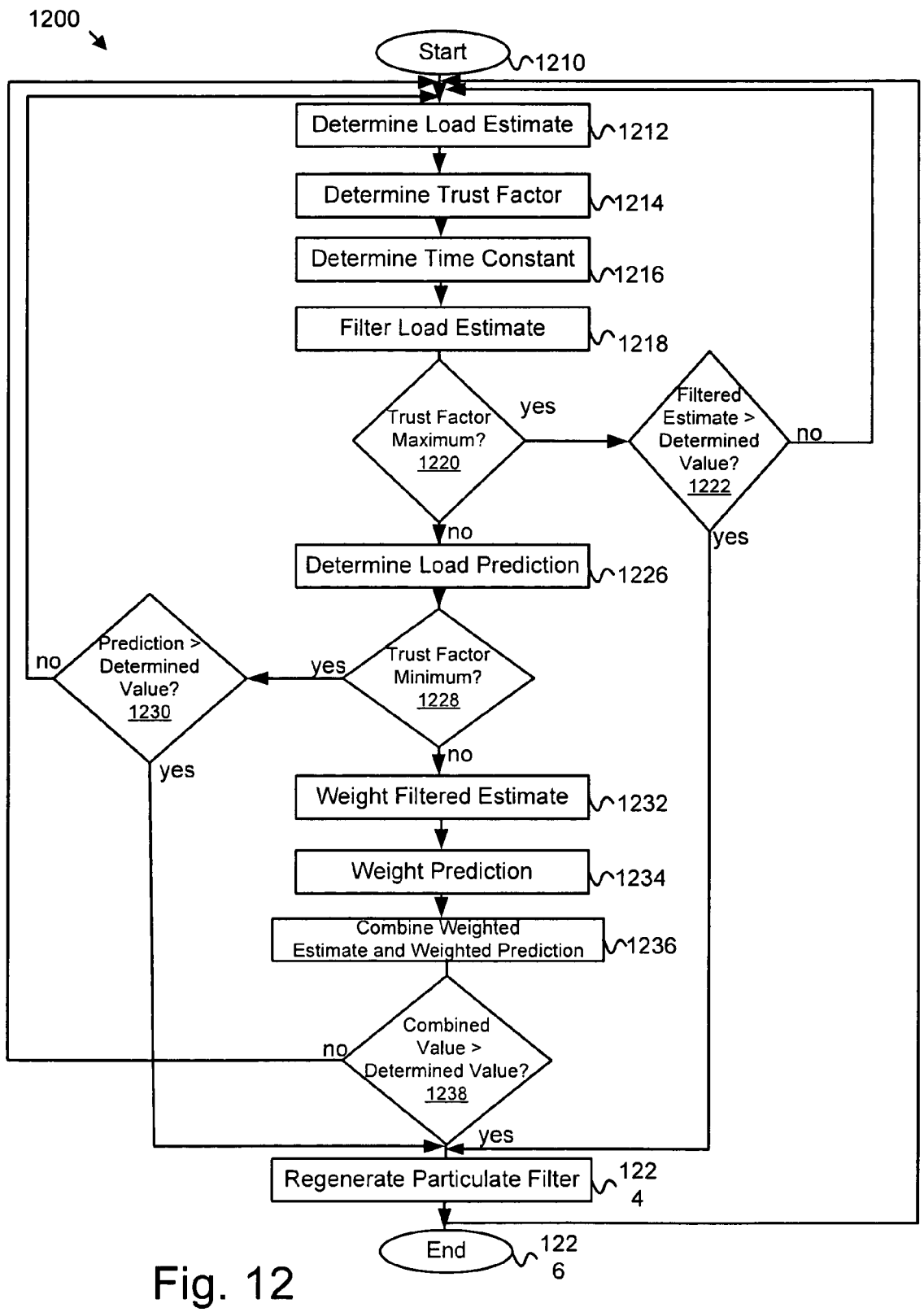
FIG. 12 is a schematic flow chart diagram illustrating one embodiment of a method of determining whether to regenerate a particulate accumulation filter according to the present invention.

FIG. 12 is a schematic flow diagram illustrating a method 1200 of determining when to regenerate a diesel particulate filter such as the filter 150. In one embodiment, the method 1200 depicts stored values and functions employed by the modules in the control system 400, as well as devices described in connection with other figures herein.

The method 1200 begins 1210, and the particulate estimator module 410 determines an estimate 1212 of the particulate that has accumulated or loaded on the filter 150. In one embodiment, this is done using inputs from the differential pressure sensor module 420a, including the differential pressure sensor 160, and exhaust flow sensor module 420b, including the exhaust gas flow sensor 165. The estimate is determined using the function 200 according to Equation 1.

The trust factor module 414 then determines 1214 a trust factor 600, using the flow rate module 515 and particulate distribution module 510, with the value of the trust factor 600 being determined by, in one embodiment, the chart shown in FIG. 6. The low-pass filter module 418 determines 1216 a time constant 915, based on the value of the trust factor 600, according to the chart shown in FIG. 9. The low-pass filter module 418 determines a filtered load estimate according to the values of the load estimate and the time constant 915 plugged into Equation 2.

If the value of the trust factor 600 is the maximum possible value, that means the filtered load estimate is accurate enough to use that value alone in determining whether to initiate regeneration of the filter 150. The controller 130 thus determines 1220 whether the trust factor 600 is at maximum value. If yes, it then determines 1222 whether the filtered load estimate value exceeds a predetermined value corresponding to an unacceptably high amount of particulate matter on the filter 150. If yes, the output module 415 instructs the regeneration device 425 to initiate regeneration 1224 of the filter 150. If no, the method 1200 begins another iteration.

The method 1200 is constantly repeating in one embodiment to continuously monitor the particulate load on the filter 150 in order to avoid uninitiated or uncontrolled regenerations and to initiate regenerations as needed.

If the trust factor 600 is not at its maximum value, the particulate predictor module 412 determines a load prediction 1226 based on input from the engine operating conditions sensor module 420c and/or other data or theoretical calculations used to construct a model for predicting the amount of particulate accumulation on the filter 150. If the trust factor 600 is at a minimum value 1228, indicating that the filtered load estimate is highly unreliable, the filtered load estimate is disregarded and the prediction value is compared with the predetermined value. If the prediction value exceeds the predetermined value 1230, the output module 415 instructs the regeneration device 425 to initiate regeneration 1224 of the filter 150. If it does not, the method 1200 begins another iteration.

If the trust factor 600 is not at a minimum value, the combination module 416 assigns the filtered estimate a weight 1232 according to the trust factor 600. In one embodiment, if the trust factor 600 has a range of 0-1, the filtered estimate and trust factor 600 are simply multiplied together. The combination module 416 also assigns the prediction a weight 1234. In one embodiment, if the trust factor 600 has a range of 0-1, the prediction is multiplied by 1 minus the trust factor 600. The combination module 416 then combines the two weighted values 1236 and compares the combined value with the predetermined value 1238. If the combined value exceeds the predetermined value, the output module 415 instructs the regeneration device 425 to initiate regeneration of the filter 150. After the regeneration determination is made, the method is repeated.

The present invention may be embodied in other specific forms without departing from its spirit or essential characteristics. For convenience's sake, in this specification the words "estimate" and "prediction" are generally used to denote total soot or particulate load on the particulate filter and the rate of soot or particulate accumulation on the filter, respectively, but they may also be used interchangeably. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for determining the status of a feature, the method comprising:
    determining a prediction of the status of the feature based at least partially on observed conditions;
    determining an estimate of the status of the feature based at least partially on observed conditions;
    determining a trust factor value, the trust factor value indicating the reliability of the estimate; and
    determining a combined estimate by combining the prediction and the estimate at least partially according to the trust factor value.

2. The method of claim 1, wherein determining the combined estimate comprises giving the estimate more weight as the trust factor value indicates greater reliability of the estimate, and giving the prediction less weight as the trust factor value indicates greater reliability of the estimate, and further comprising adding the weighted estimate to the weighted prediction.

3. The method of claim 1, wherein determining the combined estimate comprises giving the estimate less weight as the trust factor value indicates less reliability of the estimate, and giving the prediction more weight as the trust factor value indicates less reliability of the estimate, and further comprising adding the weighted estimate to the weighted prediction.

4. The method of claim 1, wherein determining the status of the feature comprises determining an amount of particulate on a diesel particulate filter, and wherein determining the prediction comprises predicting a rate of particulate accumulation on the diesel particulate filter using a predictor function of engine operating conditions or characteristics.

5. The method of claim 1, wherein determining the status of the feature comprises determining an amount of particulate on a diesel particulate filter, and wherein determining the estimate comprises estimating an amount of particulate on the diesel particulate filter using an estimator function of differential pressure across the filter and exhaust flow rate at the filter.

6. The method of claim 1, wherein determining the status of the feature comprises determining an amount of particulate on a diesel particulate filter, and wherein determining the trust factor value comprises using a function of particulate uniformity distribution on the filter and exhaust flow rate at the filter.

7. The method of claim 6, wherein determining the trust factor value comprises determining the trust factor value to be high when the exhaust flow rate and the particulate distribution uniformity are high, and wherein determining the trust factor value comprises determining the trust factor value to be low when the exhaust flow rate and the particulate distribution uniformity are low.

8. The method of claim 1, further comprising determining a time constant, the time constant comprising a function of the trust factor, and dampening the estimate according to a first-order low-pass filter function of the time constant.

9. The method of claim 8, wherein dampening the estimate comprises dampening the estimate according to the equation $$F = e^{(\frac{L}{T} \times \ln(0.632 \times E))},$$

where F is the dampened estimate, E is the estimate, T is the time constant, and L is the length of time it takes to carry out the method.

10. The method of claim 1, wherein determining the status comprises determining an amount of particulate on a diesel particulate filter, and wherein determining the estimate comprises estimating an amount of particulate on the diesel particulate filter by an estimator function of differential pressure across the filter and exhaust flow rate at the filter, and wherein determining the prediction comprises predicting an amount of particulate on the diesel particulate filter by a predictor function of engine operating conditions or characteristics, and wherein determining the trust factor value comprises determining the trust factor value by a function of particulate uniformity distribution on the filter and exhaust flow rate at the filter, and further comprising giving the estimate a weight that increases as the trust factor value indicates greater reliability of the estimate, and further comprising giving the prediction a weight that decreases as the trust factor value indicates greater reliability of the estimate, and wherein determining the combined estimate comprises adding the weighted estimate to the weighted prediction, and further comprising initiating regeneration of the filter when the combined estimate exceeds a determined value.

11. The method of claim 10, further comprising determining a time constant, the time constant being a function of the trust factor, and dampening the estimate by a first-order low-pass filter function of the time constant.

12. The method of claim 10, wherein determining the estimate comprises estimating total particulate accumulation on the filter, and wherein determining the prediction comprises predicting an incremental amount of particulate accumulation on the filter.

* * * * *